3,679,563
HOUDRIFLOW CRACKING PROCESS
André W. Pollock, West Chester, Pa., assignor to Sun Oil Company, Philadelphia, Pa.
Filed Aug. 7, 1970, Ser. No. 61,987
Int. Cl. C10g 11/14
U.S. Cl. 208—166   3 Claims

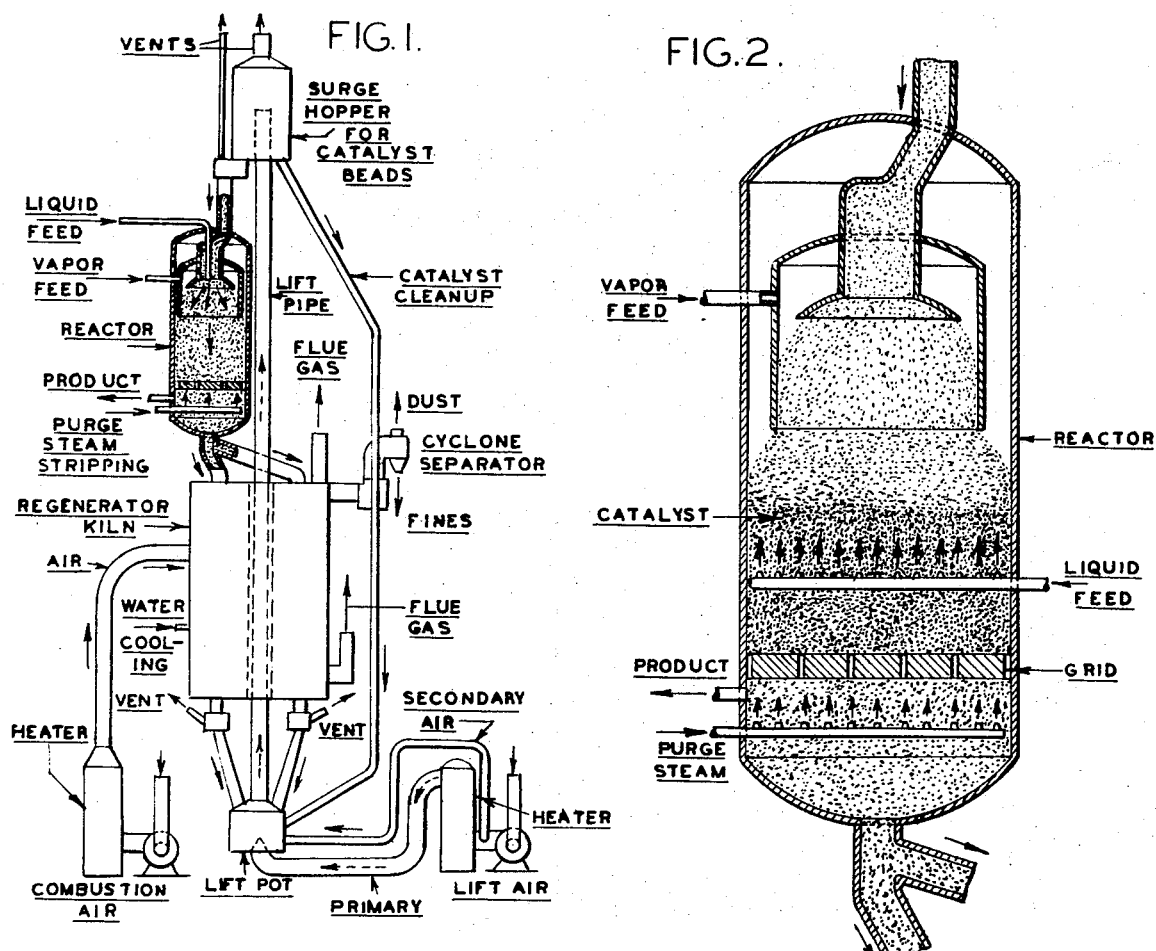
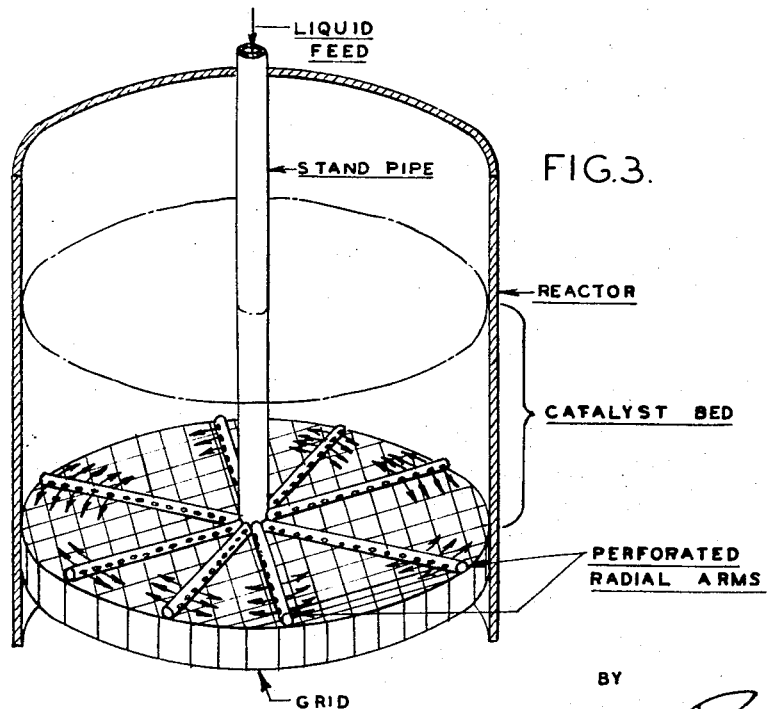

ABSTRACT OF THE DISCLOSURE

In an airlift catalytic cracking system using a highly active zeolite catalyst where the hydrocarbon is contacted by falling catalyst which forms a bed on a supporting grid, the improvement of feeding hydrocarbon vapors to the cracking zone and feeding a liquid portion of the hydrocarbon to a lower portion of said catalyst bed whereby coking on the catalyst in the cracking zone is reduced, and deactivation of the catalyst in the cracking zone is ameliorated and conversion and yields of gasoline are increased.

---

Airlift processes for the handling of catalysts in the cracking of petroleum hydrocarbons are well known and such processes are characterized by the TCC (Thermofor Catalytic Cracking) and Houdriflow systems.

This airlift process is illustrated in FIG. 1 where it will be seen the hot regenerated beads of catalyst are lifted by a air stream and then are permitted to flow downward through a reactor, a short stripping zone, and the regenerators. Liquid and vapor feed of the hydrocarbon to be cracked are introduced at the upper portion of the reactor and as the catalyst rains down through the liquid feed it builds up to form a bed on the grid within the lower portion of the reactor. The catalyst used in the process is composed of extremely hard beads or pellets of about one eighth inch diameter and until recent years have generally been primarily adsorptive materials such as natural earths, silica-alumina, kaolin, and the like. More recently, however, synthetic and natural zeolites have been developed which have much higher activities than the older catalysts. These zeolite materials are advantageous in that they result in a somewhat lower catalyst loss due to their increased strength and also give much larger yields of gasoline. They are also more sensitive to deactivation through coke formation on their surface.

Although the majority of the hydrocarbon feed to the cracking reactor is vapor, a liquid portion is also injected into the reactor and this portion tends to form most of the coke on the catalyst. This coke is needed so that when the catalyst reaches the regeneration stage, sufficiently high temperatures will be maintained for regeneration to successfully occur. Formation of coke on the catalyst, however, in the cracking portion of the reactor is detrimental to cracking efficiency.

In accordance with this invention an improvement is provided in the airlift catalytic cracking apparatus where a zeolite catalyst is used in that the liquid hydrocarbon is introduced at the lower portion of the catalyst bed at a point which is between about mid-point and the bottom of the catalyst bed. Preferably, the liquid will be introduced just above the grid which supports the bed of catalyst. In this way, the catalyst is not degraded by coke formation during the cracking stage, but is provided with coke formation just prior to the regeneration step where it is desired.

It will be understood that in the process of this invention the total amount of coke formed on the catalyst is about the same as in previous processes, but the point at which coke is formed is shifted giving improved catalyst performance and thus permits greater conversion and gasoline yield. This increase in conversion and yield is on the order of about 1 to about 2% greater conversion and about 0.5 to about 1% gasoline yield and these improvements are significant and of high economic value in view of the large volumes of hydrocarbons processed.

FIG. 2 is the reactor portion of the airlift apparatus and indicates vapor feed at the top of the reactor in the normal fashion, but shows, in accordance with the invention, introduction of liquid feed at the lower portion of the reactor just above the grid supporting the catalyst bed. Reaction conditions within the reactor are conventional and are indicated by the following table for both the Thermofor Catalytic Cracking system and the Houdriflow system.

OPERATING CONDITIONS IN AIRLIFT CATALYTIC CRACKING PROCESSES

|  | TCC | Houdriflow |
|---|---|---|
| Reactor temp., °F | 840–930 | 850–925 |
| Reactor (top) pressure, p.s.i.g. | 9–14 | 6–12 |
| Catalyst/oil ratio | 2–5 | 3–7 |
| Space velocity, v./v.-hr | 1–3.5 | 1.5–4 |
| Regenerator temp, °F | 960–1,080 | 900–1,100 |
| Regenerator pressure, p.s.i.g. | Atm.–1.0 | Atm. |
| Regenerator air temp., °F | Atm.–1,000 |  |
| Hydrogen, percent of coke | 2.5–8 | 2.5–8 |
| Catalyst replacement and loss, lb./bbl. processed | 0.15–0.30 | 0.2–0.3 |

The manner of introducing the liquid feed at the bottom portion of the reactor may be varied and will use any of the many available means for dispersing liquid at this point. For example, the hydrocarbon liquid may be introduced at the side of the lower portion of the reactor into any type of spray device to distribute the liquid through the catalyst bed. Alternatively, liquid may be introduced at the upper portion of the reactor through a standpipe so that it flows through the standpipe to a distribution system at the lower portion of the catalyst bed. This latter alternative is illustrated in FIG. 3 where a series of arms radiating from a centrally disposed standpipe is shown. The liquid feed thereby being distributed through the perforations in the radial arms to the lower portion of the reactor. Other alternative means for distribution of the liquid feed to the catalyst bed will be obvious to the skilled art worker.

To illustrate the invention further and provide an indication of the improvements achieved the following example is given:

EXAMPLE

In a conventional Houdriflow cracking process liquid and vapor of hydrocarbon are introduced together above the catalyst bed in the usual manner. The conversion of hydrocarbon is 75.7% and gasoline yield is 59.0%.

When the process is carried out under the same conditions as above, except that the liquid hydrocarbon is distributed throughout the bed at its mid-point, conversion is increased to 76.7% and gasoline yield is increased to 59.5%.

The invention claimed is:

1. In an air airlift catalytic cracking system where a zeolite catalyst is employed and where liquid and vapors of the hydrocarbon are contacted in a cracking zone by falling catalysts which forms a bed on a supporting grid, the improvement which comprises feeding vapors of the hydrocarbon to be cracked to said cracking zone and feeding liquid hydrocarbon at a point between about the mid-point and the bottom of said catalyst bed.

2. The process of claim 1 where the liquid hydrocarbon is introduced just above the grid which supports the bed of catalyst.

3. In a catalytic cracking system where a catalyst highly sensitive to deactivation through coke formation is employed and where liquid and vapors of the hydrocarbon are contacted in a cracking zone by falling catalyst which forms a bed on a supporting grid, the improvement which comprises feeding vapors of the hydrocarbon to be cracked to said cracking zone and feeding liquid hydrocarbon at a point between about the mid-point and the bottom of said catalyst bed.

References Cited

UNITED STATES PATENTS

| | | | |
|---|---|---|---|
| 2,767,128 | 10/1956 | Burtis | 208—166 |
| 2,799,625 | 7/1957 | Drew | 208—166 |
| 2,556,514 | 6/1951 | Bergstrom | 208—166 X |
| 2,666,731 | 1/1954 | Bergstrom | 208—174 |

DELBERT E. GANTZ, Primary Examiner

U.S. Cl. X.R.

208—120, 174